(No Model.) 2 Sheets—Sheet 1.

R. LYONS.
CORN CULTIVATOR.

No. 544,736. Patented Aug. 20, 1895.

Witnesses
V. B. Hillyard
Harold H. Simms

Inventor
Robert Lyons
By his Attorneys,
C. A. Snow & Co.

(No Model.) 2 Sheets—Sheet 2.
R. LYONS.
CORN CULTIVATOR.
No. 544,736. Patented Aug. 20, 1895.
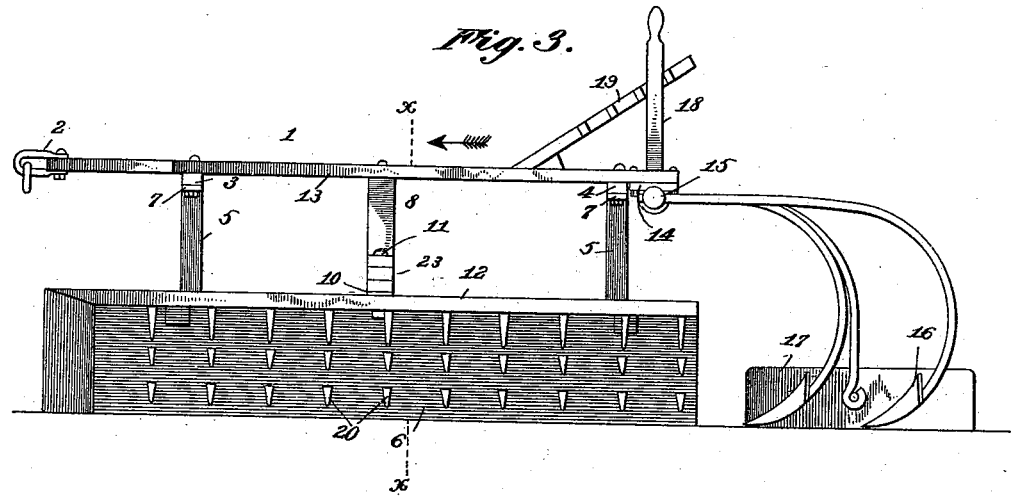
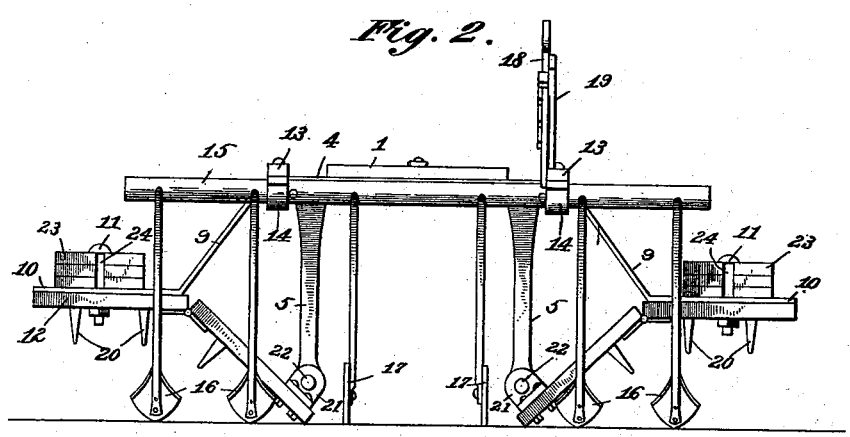
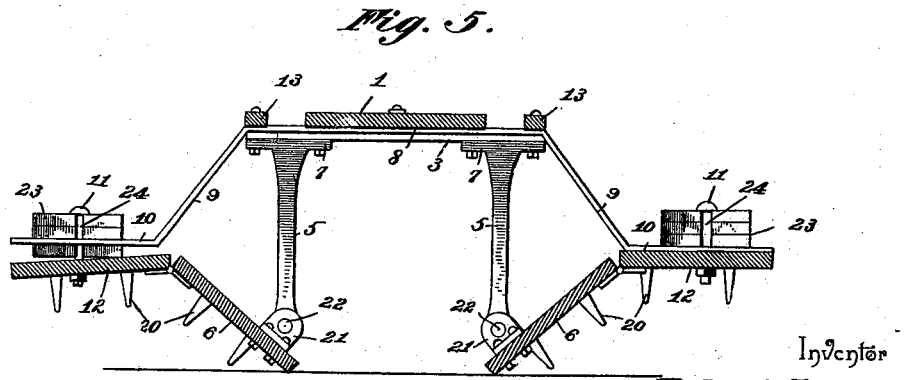
Witnesses
V. B. Hillyard
Harold H. Simms
Inventor
Robert Lyons.
By his Attorneys,
C. A. Snow & Co.

UNITED STATES PATENT OFFICE.

ROBERT LYONS, OF LUCKY VALLEY, IOWA.

CORN-CULTIVATOR.

SPECIFICATION forming part of Letters Patent No. 544,736, dated August 20, 1895.

Application filed May 21, 1895. Serial No. 550,116. (No model.)

*To all whom it may concern:*

Be it known that I, ROBERT LYONS, a citizen of the United States, residing at Lucky Valley, in the county of Woodbury and State of Iowa, have invented a new and useful Corn-Cultivator, of which the following is a specification.

My present invention relates to that class of agricultural implements for cultivating corn, and is designed more especially as an improvement on the machines set forth in my prior patents, Nos. 481,634 and 496,884, and aims to provide a machine for cultivating both planted and listed corn, and which can be operated on the side of a hill or upon rolling ground without lateral sliding movement, and which will follow the direction of the team, all as will appear more fully hereinafter and set forth in the accompanying drawings, in which—

Figure 1:
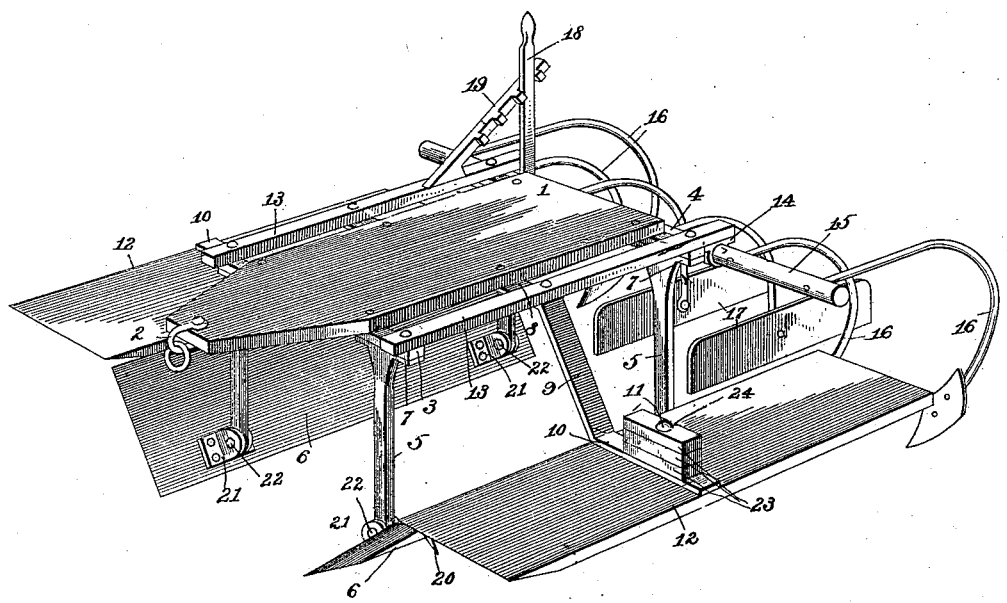
Figure 4:
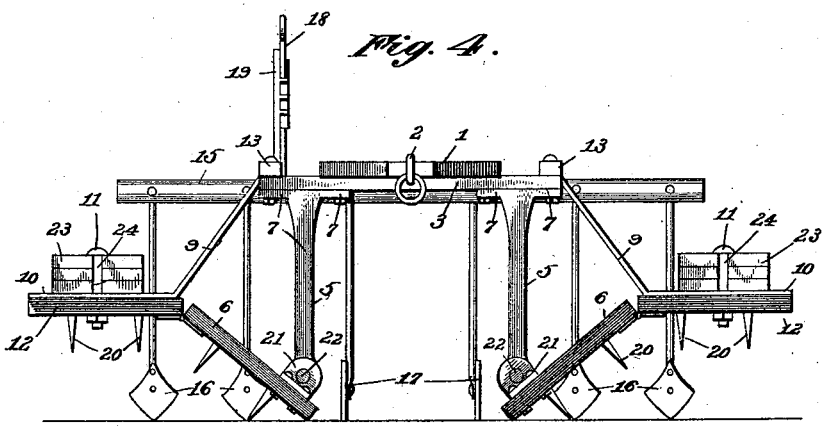
Figure 6:

Figure 1 is a perspective view of a cultivator embodying the novel features of the present invention. Fig. 2 is a rear elevation of the same. Fig. 3 is a side elevation of the machine. Fig. 4 is a front view thereof. Fig. 5 is a cross-section on the line X X of Fig. 3, looking in the direction of the arrow, showing the adjusting-blocks on the right-hand end of the arch placed above the latter and some placed between the left-hand end of the arch and the horizontal harrow-wing. Fig. 6 is a detail view of an adjusting-block.

The platform 1 is provided at its front end with a draft-clevis 2 and with front and rear cross-beams 3 and 4, which have their end portions extending beyond the edges of the platform 1 to receive the knees or supports 5, to which the inner harrow-wings 6 are pivotally connected in proximate relation to their inner or lower edges. The knees 5 are provided with flanges 7 at their upper ends, which are apertured to receive the bolts or fastenings, by means of which the said knees are firmly attached to the respective cross-beams, and said flanges 7 are sufficiently long to obtain an extended bearing against the lower sides of the said cross-beams, whereby the knees are braced against lateral stress. Obviously the knees may be replaced by suitable supports of desired construction, whereby the same results are attained. An arch 8 is located midway between the front and rear ends of the machine and has its upper horizontal portion firmly attached to the lower side of the platform 1, and has its end portions extending downwardly and outwardly, as shown at 9, and horizontally, as shown at 10, and these horizontal portions 10 are vertically apertured for the passage of bolts 11, by means of which the outer or horizontal harrow-wings 12 have adjustable connection therewith.

To strengthen the cross-beams 3 and 4 and the arch 8 longitudinal side beams 13 are provided and secured in any approved manner to the outer ends of the said cross-beams 3 and 4 and to the outer portions of the upper part of the arch 8 in proximate relation to the outwardly and downwardly inclined parts 9, and the rear ends of these longitudinal side beams are extended beyond the rear cross-beam 4 and have bearings 14 applied to their lower sides, and in which is journaled a transversely-disposed shaft 15, carrying cultivators 16 and fenders 17 in the usual manner. The shaft 15 is turned or rocked in its bearings by means of an operating-lever 18, which is adapted to be sprung laterally at its upper end to be engaged with or disengaged from a series of notches in an arm or bar 19, made fast to the frame of the machine and extending upwardly and rearwardly therefrom. The inner harrow-wings 6 and the outer harrow-wings 12 are of similar construction and hinged together at their opposing edges and are provided on their lower or working faces with a series of teeth or knives 20 for pulverizing the earth and crushing clods or lumps, and the inner wings 6 are secured at their lower edges to the knees or supports 5 by hinge or pivotal connections, the latter being obtained by means of castings 21, fastened to the upper or rear faces of the said wings and comprising ears between which the lower ends of the knees 5 are fitted and secured by pivts 22.

The outer or horizontally-disposed harrow-wings 12 are secured to the horizontal portions 10 of the arch by means of the vertical bolts 11 and are vertically adjustable within certain limits by means of adjusting-blocks 100 23, which are adapted to be interposed between the upper sides of the wings 12 and the lower sides of the horizontal parts 10, and these adjusting-blocks have notches 24 extending inward from one edge for the passage of the vertical bolts 11 when fitting or removing the said blocks therefrom. By this means—that is, the laterally-extending notches 24—the adjusting-blocks can be placed upon or removed from the vertical bolts 11 without the necessity of removing the latter from the arch or wings. When starting the machine, the adjusting-blocks are disposed in a pile above the horizontal portions 10 of the arch, and when it is required to adjust the harrow-wings the vertical bolts 11 are loosened and a spacing-block removed from the pile and inserted between the harrow-wing 12 and the horizontal portion 10, thereby lowering said harrow-wing and changing the relative inclination of the inner harrow-wing 6. This operation is continued until the required adjustment is attained, one adjusting-block, or more, if necessary, being removed from the pile above the horizontal portion 10 and placed beneath the same to effect the required adjustment of the outer and inner harrow-wings. It will be understood that the adjustment for one set of harrow-wings will apply to the sets of harrow-wings on each side of the machine.

The implement is simple and possessed of superior advantages, and in constructing the same for various purposes I will have it understood that changes in the form, proportion, and the minor details of construction may be resorted to without departing from the principle or sacrificing any of the advantages of this invention.

Having thus described the invention, what is claimed as new is—

1. A cultivator for the purposes described, comprising a platform having pendent supports at its sides, inner and outer harrow wings hinged together at their opposing edges and to the lower ends of the said side supports, an arch secured to the platform between its ends and having its outer portions occurring in a horizontal plane, vertical bolts connecting the outer, or horizontal, harrow wings with the horizontal portions of the arch, and a series of adjusting blocks supported in a pile upon the vertical bolts and having notches extending inward from one edge, whereby the said adjusting blocks can be detached from the bolts and moved from one to the other side of the horizontal portions of the arch to effect an adjustment of the harrow wings without the necessity of removing the said vertical bolts, substantially as described for the purpose set forth.

2. The herein shown and described cultivator, comprising a platform having front and rear cross beams bracingly connected at their outer ends by longitudinal side beams, knees having their upper ends flanged and firmly secured to the end portions of the cross beams, inner and outer harrow wings hinged together and to the lower ends of the said knees, an arch located intermediate of the ends of the platform and secured to the latter and to the side beams, and having its outer end portions occurring in a horizontal plane and secured to the outer, or horizontal, harrow wings by vertical bolts, a series of adjusting blocks disposed in a pile and mounted upon the said vertical bolts, and adapted to be moved from one to the other position relative to the horizontal portions of the arch, whereby the harrow wings are relatively adjusted, and a transverse shaft journaled in bearings provided on the side beams and carrying cultivators and fenders, and provided with an operating lever which is adapted for engagement with a notched bar to hold the said shaft in the located position, substantially as set forth.

In testimony that I claim the foregoing as my own I have hereto affixed my signature in the presence of two witnesses.

ROBERT LYONS.

Witnesses:
THOMAS COYLE, Sr.,
CHARLEY COYLE.